United States Patent
Seok

(10) Patent No.: US 10,345,172 B1
(45) Date of Patent: Jul. 9, 2019

(54) APPARATUS FOR MEASURING AXIAL FORCE AND FRICTIONAL TORQUE OF THREADED PART AND MEASURING METHOD USING THE SAME

(71) Applicant: E-cube System Inc., Ansan-si (KR)

(72) Inventor: Sung Fie Seok, Seongnam-si (KR)

(73) Assignee: E-cube System Inc., Ansan-si (KR)

(*) Notice: Subject to any disclaimer, the term of this patent is extended or adjusted under 35 U.S.C. 154(b) by 0 days.

(21) Appl. No.: 15/901,270

(22) Filed: Feb. 21, 2018

(51) Int. Cl.
*G01L 5/00* (2006.01)
*G01L 5/24* (2006.01)

(52) U.S. Cl.
CPC .............. *G01L 5/24* (2013.01); *G01L 5/0042* (2013.01)

(58) Field of Classification Search
CPC ................................ G01L 5/24; G01L 5/0042
USPC ...................................................... 73/862.041
See application file for complete search history.

(56) References Cited

U.S. PATENT DOCUMENTS

| | | | | |
|---|---|---|---|---|
| 4,397,196 A * | 8/1983 | Lemelson | ............ | B25B 23/1425 702/43 |
| 5,172,616 A * | 12/1992 | Negishi | .................... | B25B 23/14 81/429 |
| 5,615,575 A * | 4/1997 | Goodwin | ................. | B23P 19/06 411/14 |
| 6,105,475 A * | 8/2000 | Ohmi | ..................... | B23P 19/066 81/429 |
| 6,196,071 B1 * | 3/2001 | Shomo | ..................... | B25B 23/14 173/176 |
| 2003/0065456 A1 * | 4/2003 | McGee | .................... | B25B 23/14 702/41 |
| 2005/0050720 A1 * | 3/2005 | Asano | ..................... | B23P 19/02 29/714 |

FOREIGN PATENT DOCUMENTS

KR 20100000565 1/2010

* cited by examiner

*Primary Examiner* — Max H Noori
(74) *Attorney, Agent, or Firm* — Cantor Colburn LLP

(57) ABSTRACT

Provided is an apparatus for measuring axial force and frictional torque of a threaded part, including: a fastening member having a threaded hole through which an external threaded part passes, and coming into contact with a head of the external threaded part fitted into the threaded hole; a support body supporting the fastening member; an internal threaded part engaging with an external threaded part fitted into the fastening member and spaced apart from the fastening member; a load cell fixedly supporting the internal threaded part and measuring axial load and frictional torque that are transmitted from the external threaded part to the internal threaded part; and a torque application unit applying torque to the external threaded part.

18 Claims, 10 Drawing Sheets

APPARATUS FOR MEASURING AXIAL FORCE AND FRICTIONAL TORQUE OF THREADED PART AND MEASURING METHOD USING THE SAME

TECHNICAL FIELD

The present invention relates to an apparatus for measuring axial force and frictional torque of a threaded part and a measuring method using the apparatus, which are intended to previously identify optimal torque that is to be applied to threaded parts upon handling various kinds of threaded parts including a bolt or a nut.

BACKGROUND ART

A fastening component (hereinafter referred to as a threaded part), such as a screw, a bolt or a nut, which is essentially used in most industrial fields and is common in daily life is a mechanical element for fixedly fastening separate objects to each other. This is advantageous in that a fastening process is simpler than that of welding, riveting or bonding and objects joined by the threaded part may be separated again from each other if necessary.

A fastening method using the threaded part is advantageous in that a fastening structure is simple and a fastening force may be adjusted. However, this is problematic in that it may cause side effects when the threaded part is excessively strongly or weakly tightened.

For example, when the bolt is strongly tightened with torque exceeding a yield point, the bolt may be broken or lose resilience even if the bolt is not immediately broken, so that the bolt may not maintain designed fastening force for a long time. In contrast, if the bolt is tightened with force lower than optimal torque, the bolt may be gradually loosened by vibration or the like, or structural problems may occur because fastening force is small at a junction. For this reason, it is very important to apply prescribed torque when objects should be joined to each other.

Among control methods for adjusting torque applied to the threaded part, a torque-value control method using a torque wrench utilizes a linear relation between the applied torque and tightening force. Since the torque-value control method is affected by the frictional coefficient of a threaded part, axial force may be undesirably changed depending on a difference in frictional coefficient. That is, since the frictional coefficient of the threaded part varies depending on the machining precision of threads, surface-treatment specifications, the application of oil, etc., the frictional coefficient of the threaded part should be identified to obtain exact fastening torque.

Generally, in order to find a relation between tightening torque $T_T$ or loosening torque $T_L$ (hereinafter referred to as applied torque) and axial force Q when the threaded part is tightened or loosened, a frictional coefficient (tan $\rho = \mu$) in threads and a frictional coefficient $\mu_n$ between the head of the bolt and a plate contacting therewith should be identified.

Furthermore, in order to identify the frictional coefficient $\mu_n$, torque $T_B$ generated by the frictional force of threads and torque $T_W$ generated by the frictional force between the bolt head and the plate should be calculated. However, an apparatus for measuring the torque in general threaded parts has not yet been developed, and a relation $T_T$–Q between the tightening torque $T_T$ and the axial force Q is merely experimentally calculated and applied.

In addition, in order to experimentally calculate the relation $T_T$–Q between the tightening torque $T_T$ and the axial force Q, the axial force Q acting on the threaded part should be measured in real time while the threaded part is tightened with predetermined torque. To this end, a strain gauge should be attached to the threaded part or a special threaded part equipped with an axial force sensor should be used.

In order to attach the strain gauge to the threaded part, damage to the threaded part is inevitable. Thus, the structure of the threaded part is changed and thereby it is difficult to obtain a correct measured value. Since the special threaded part equipped with the axial force sensor is expensive and threaded parts vary in frictional coefficient, the test result obtained from the threaded part may be different from the test result of an actual threaded part.

Moreover, the experiment using the sensor may measure the axial force Q generated by the tightening torque $T_T$ of the threaded part, but may not measure the torque $T_B$ generated by friction of threads and the torque $T_W$ generated by friction between the head of the threaded part (or washer) and the plate. Consequently, it is impossible to calculate the frictional coefficient (tan $\rho = \mu$) in the threads and the frictional coefficient $\mu_n$ between the head and the plate.

A bolt-loosening test apparatus, a so-called Junker tester may measure the axial force of the bolt using a load cell, but may not measure the torque $T_B$ generated by friction of the threads and the torque $T_W$ at each part generated by friction between the bolt head and the plate.

An apparatus and method for measuring a frictional coefficient disclosed in Korean Patent Laid-Open Publication 10-2010-0000565 (Title: apparatus and method for measuring frictional coefficient of threaded part) measures tightening torque and loosening torque by repeatedly tightening or loosening a threaded part using a drive motor and a reducer, indirectly calculates axial force using a theoretical equation based on a difference between two torques, and indirectly calculates a frictional coefficient using a theoretical equation based on the sum of two axial forces. However, the calculation using such an indirect method is problematic in that an error is large. Although the frictional coefficient (tan $\rho = \mu$) of the threaded part is different from the frictional coefficient $\mu_n$ of the bolt head, the cited document performs measurement on the assumption that the frictional coefficients of the two parts are equal to each other, so that a calculated value contains many errors.

SUMMARY OF THE INVENTION

Technical Problem

Accordingly, the present invention has been made keeping in mind the above problems occurring in the related art, and an object of the present invention is to provide an apparatus for measuring axial force and frictional torque of a threaded part and a measuring method using the apparatus, which are capable of directly measuring axial force generated by tightening torque in an actually used threaded part, thus allowing frictional torque generated in a head of the threaded part and frictional torque generated in threads to be separately measured and consequently making it possible to identify a frictional coefficient of each part.

Another object of the present invention is to provide an apparatus for measuring axial force and frictional torque of a threaded part and a measuring method using the apparatus, which are capable of simulating an environmental situation of an actual site on which a threaded part is used, in the case of measuring axial force and frictional torque when torque is applied to the threaded part, thus allowing the axial force and the frictional torque depending on environment to be identified.

Solution to Problem

In order to achieve the object, An apparatus for measuring axial force and frictional torque of a threaded part system according to a first aspect of the invention, includes: a fastening member (17c) having a threaded hole (17d) through which an external threaded part passes, and coming into contact with a head (19a) of the external threaded part fitted into the threaded hole (17d); a support body (17b) supporting the fastening member (17c); an internal threaded part engaging with an external threaded part fitted into the fastening member (17c) and spaced apart from the fastening member (17c); measurement means fixedly supporting the internal threaded part and measuring axial load and frictional torque that are transmitted from the external threaded part to the internal threaded part; and a torque application unit applying torque to the external threaded part, wherein the torque application unit further comprises a torque sensing unit (15b) to measure an applied tightening torque value, torque generated by frictional force between the head (19a) and the fastening member (17c) is obtained by a value calculated by subtracting a frictional torque value measured by the measurement means from the tightening torque value measured by the torque sensing unit (15b).

The apparatus according to the invention, further includes: a base plate (17a) provided under the support body (17b), wherein the measurement means comprises a load cell (18) to support the internal threaded part while being secured on the base plate (17a).

The apparatus according to the invention, further includes: a base plate (17a) provided under the support body (17b), wherein the measurement means comprises at least one of a torque load cell (18a) measuring torque and an axial-load load cell (18b) measuring axial force, the load cells being disposed on the base plate (17a).

In the apparatus according to the invention, wherein the internal threaded part comprises an integral nut (17e) that fixedly comes into close contact with the measurement means and transmits torsional force and axial force through the external threaded part (19) to the measurement means.

In the apparatus according to the invention, wherein the internal threaded part comprises a separable nut (27) supported on a holder (25) in a state where it is separated from the measurement means, and transmitting torsional force and axial force delivered through the external threaded part (19), through the holder (25) to the measurement means.

An apparatus for measuring axial force and frictional torque of a threaded part according to the invention, includes: a plate-shaped fastening member (17c) having a threaded hole (17d) through which an external threaded part passes; a support body (17b) supporting the fastening member (17c); a holder (25) holding the external threaded part in a state where the holder is located under the fastening member (17c), holding the external threaded part to allow it to pass upwards through the threaded hole (17d), and spaced apart from the fastening member (17c); an internal threaded part coming into contact with the fastening member (17c) in a state where the internal threaded part engages with the external threaded part above the fastening member (17c); measurement means coupled with the holder (25), and measuring axial load transmitted through the holder (25) and frictional torque between threads of the external threaded part and the internal threaded part; and a torque application unit applying torque to the internal threaded part, wherein the torque application unit further comprises a torque sensing unit (15b) to measure an applied tightening torque value, torque generated by frictional force between the internal threaded part and the fastening member (17c) is obtained by a value calculated by subtracting a frictional torque value measured by the measurement means from the tightening torque value measured by the torque sensing unit (15b).

The apparatus according to the invention, further includes: a base plate (17a) provided under the support body (17b), wherein the measurement means comprises a load cell (18) to support the holder (25) while being secured on the base plate (17a).

The apparatus according to the invention, further includes: a base plate (17a) provided under the support body (17b), wherein the measurement means comprises at least one of a torque load cell (18a) measuring torque and an axial-load load cell (18b) measuring axial force, the load cells being disposed on the base plate (17a).

The apparatus according to the invention, further includes: a casing (37) accommodating the measuring apparatus therein.

In the apparatus according to the invention, wherein the casing (37) further comprises an adjustment unit to adjust temperature or humidity in the casing (37).

The apparatus according to the invention, further includes: a vertical shaft (15f) inducing torque transmitted from the torque application unit to the external threaded part or the internal threaded part, extending vertically, and positioned vertically above the external threaded part or the internal threaded part; a bearing (15h) supporting the vertical shaft (15f) to be axially rotatable; and a support frame (30) fixing the bearing (15h).

In the apparatus according to the invention, wherein the torque application unit comprises a manual torque application unit (13) that is manually operated to apply torque, or an electric-powered torque application unit (32) that is operated by electric power transmitted from an outside.

A method of measuring axial force and frictional torque of a threaded part according to the invention, includes: an internal-thread setting step of directly or indirectly setting an internal threaded part to measurement means that measures the axial force and the torsional force; a fastening-member installing step of installing a fastening member (17c) with a threaded hole (17d) through which an external threaded part passes, such that the fastening member corresponds to the internal threaded part while being spaced apart therefrom; a temporary mounting step of coupling the external threaded part to the internal threaded part such that the external threaded part passes through the threaded hole (17d) and thereby a head (19a) of the external threaded part comes into contact with the fastening member (17c); a torque application step of applying torque to the external threaded part when the temporary mounting step has been completed, thus transmitting axial force and torsional force to the internal threaded part; and a measurement step of measuring force transmitted to the internal threaded part, using the measurement means, wherein, at the torque application step, a torque application unit applying the torque to the external threaded part measures an applied tightening torque value, using a torque sensing unit (15b), at the measurement step, the measurement means is coupled with a holder (25) and measures axial load transmitted through the holder (25) and frictional torque between threads of the external threaded part and the internal threaded part, torque generated by frictional force between the head (19a) and the fastening member (17c) is obtained by a value calculated by subtracting a frictional torque value measured by the measurement means from the tightening torque value measured by the torque sensing unit (15b).

A method of measuring axial force and frictional torque of a threaded part according to the invention, includes: a holder setting step of setting a holder (25) to measurement means that measures the axial force and the torsional force; a fastening-member installing step of installing a plate-shaped fastening member (17c) with a threaded hole (17d) such that the fastening member is correspondingly located above the holder (25) to be spaced apart therefrom; a temporary mounting step of causing an external threaded part to pass upwards through the holder (25) such that the external threaded part passes upwards through the threaded hole (17d) of the fastening member (17c), coupling an internal threaded part with the external threaded part above the fastening member (17c), and rendering the internal threaded part after coupling to come into contact with the fastening member (17c); a torque application step of applying torque to the internal threaded part when the temporary mounting step has been completed, thus transmitting axial force and torsional force to the holder (25); and a measurement step of measuring force transmitted to the holder (25), using the measurement means, wherein, at the torque application step, a torque application unit applying the torque to the internal threaded part measures an applied tightening torque value, using a torque sensing unit (15b), at the measurement step, the measurement means is coupled with the holder (25) and measures axial load transmitted through the holder (25) and frictional torque between threads of the external threaded part and the internal threaded part, torque generated by frictional force between the internal threaded part and the fastening member (17c) is obtained by a value calculated by subtracting a frictional torque value measured by the measurement means from the tightening torque value measured by the torque sensing unit (15b).

Advantageous Effects of the Invention

As described above, the apparatus for measuring the axial force and the frictional torque of the threaded part of the present invention is capable of directly measuring axial force generated by the fastening torque of the threaded part under the actual fastening condition of the threaded part, allows the frictional torque generated in the head of the threaded part that are actually used and the frictional torque generated in the threads to be separately measured, allows the frictional coefficient of the head of the threaded part and the frictional coefficient of the threaded part to be separately measured, and consequently enables the fastening torque and the fastening structure of the threaded part to be precisely designed.

Furthermore, in the case of measuring the axial force and the frictional coefficient by applying torque to the threaded part, it is possible to simulate the environmental situation of the actual site, thus allowing the axial force and the frictional torque of the threaded part depending on temperature or humidity to be identified.

DESCRIPTION OF EMBODIMENTS

Figure 1:
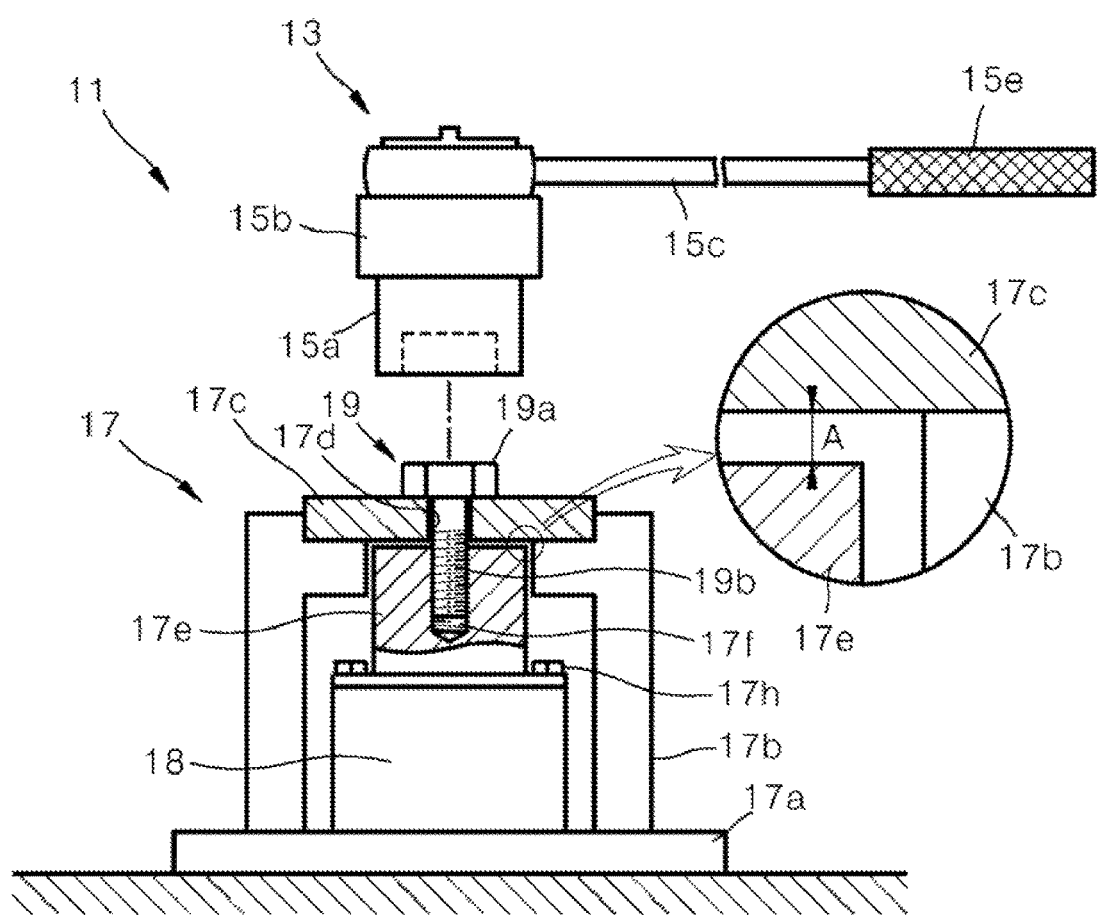
FIGS. 1 to 3 are views illustrating the general configuration and concept of an apparatus for measuring axial force and frictional torque of a threaded part according to an exemplary embodiment of the present invention.

Hereinafter, an exemplary embodiment of the present invention will be described in detail with reference to the accompanying drawings.

Generally, an apparatus 11 for measuring axial force and frictional torque according to the exemplary embodiment is intended to measure the axial force generated by the fastening torque of the threaded part and the frictional torque acting on each part of the threaded part. An objective of measuring the axial force generated by the fastening torque is to determine optimal fastening torque for the purpose of maintaining proper fastening force and preventing the threaded part from being unexpectedly loosened.

Another objective of measuring the frictional torque is to identify the frictional coefficient at each part of the threaded part. The frictional coefficient is measured so as to check the frictional properties of each part and then calculate an optimal torque value that is to be applied when the same kind of threaded part is tightened or loosened.

In addition, for the convenience of description, a bolt 19, an integral nut 17e and a separable nut 27 will be described as an example of threaded part. However, the threaded part of the present invention embraces the bolt 19, the nuts 17e and 27, other screws or special bolts and nuts and the like. Further, this includes the case of fastening an external threaded part to a fixed internal threaded part as well as the case of fastening an internal threaded part to a fixed external threaded part.

Further, each part includes a part on which threads are formed, a bottom friction part of a head of the external threaded part coming into close contact with an object, and a bottom friction part of the internal threaded part coming into close contact with an object.

FIG. 1 is a view illustrating the general configuration of an apparatus 11 for measuring axial force and frictional torque of a threaded part according to an exemplary embodiment of the present invention.

As shown in the drawing, the apparatus 11 for measuring the axial force and the frictional torque according to the exemplary embodiment generally has a measuring unit 17 into which a bolt 19 to be measured is fitted, and a manual torque application unit 13 that measures torque which is actually applied to the bolt 19 when it is tightened or loosened.

First, the measuring unit 17 includes a plate-shaped base plate 17a that forms a horizontal plane, a load cell 18 that is secured to a top of the base plate 17a to simultaneously measure both the axial force and the torque, the integral nut 17e mounted on the load cell 18, a support body 17b that accommodates the load cell 18 and the integral nut 17e in a central portion thereof, a fastening member 17c that is horizontally secured throughout the support body 17*b* and spaced apart from the integral nut 17*e* by a distance A, and the bolt 19 that passes through the fastening member 17*c* and is fastened to the integral nut 17*e*.

The bolt 19, the integral nut 17*e* and the fastening member 17*c* are a bolt, a nut and a fastening member that are actually used on the site. That is, the bolt 19 is a bolt that is actually used on the site, and is taken from a place where the integral nut 17*e* and the fastening member 17*c* are used.

By adopting the actually used bolt, nut and fastening member, it is possible to precisely measure the fastening torque and axial force of the actually used fastening member and thereby define recommended torque.

In this regard, the measuring unit 17 may be a simulation apparatus that simulates the assembly of the actually used fastening unit. For example, the integral nut 17*e* is taken from a structure on which internal threads are formed, and the fastening member 17*c* is taken from an object that is to be fixed to the structure, namely, the fastening member, and the bolt 19 becomes a simulation apparatus that is under the same condition as the actual use condition, if a bolt for fixing the fastening member to the structure is employed.

The base plate 17*a* is a plate-shaped member having a predetermined thickness, supports the support body 17*b* and the load cell 18, and is not changed by external force exerted thereon during a test. Even if the bolt 19 is strongly tightened, a position of the load cell 18 relative to the support body 17*b* is not changed.

The support body 17*b* serves to horizontally support the fastening member 17*c* on the base plate 17*a*, and is not likewise changed by external force. As long as the support body plays such a role, the shape of the base plate 17*a* and the support body 17*b* may be changed in many various ways.

Further, the load cell 18 is a type of load cell capable of simultaneously measuring the axial force and the torque transmitted through the integral nut 17*e*, namely, an integrated load cell.

Figure 4:
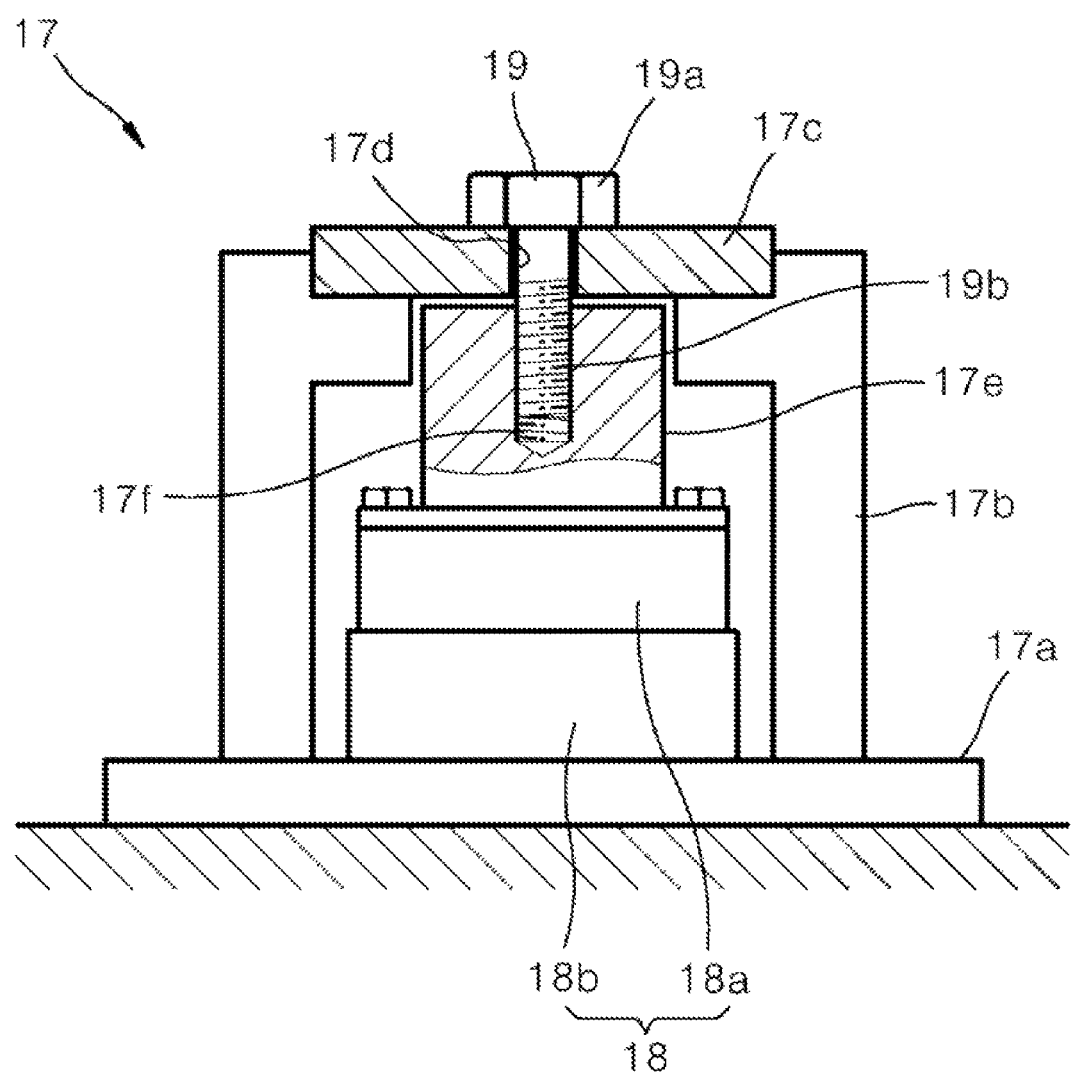
FIGS. 4 to 7 are views illustrating other configurations of the apparatus for measuring the axial force and the frictional torque shown in FIG. 1.

According to circumstances, as illustrated in FIG. 4, the torque load cell 18*a* may be combined with the axial-load load cell 18*b*. That is, instead of the integrated load cell, the torque load cell 18*a* measuring only torque and the axial-load load cell 18*b* measuring only axial load may be combined to be arranged vertically.

Moreover, the torque load cell 18*a* or the axial-load cell 18*b* may be selectively used as necessary, depending on the purpose of the test.

The load cell 18 according to the exemplary embodiment serves to identify axial force acting on the integral nut 17*e* and axial rotating force, namely, torque generated about an external threaded part 19*b* as a central axis when the bolt 19 is fastened to or unfastened from the integral nut 17*e*.

The integral nut 17*e* is fixed to the top of the load cell 18 via a plurality of fixing threaded parts 17*h* or via a bolt or a nut formed on the integral nut, and has an internal threaded hole 17*f* that is formed in a central portion of the integral unit to be opened upwards. Of course, a central axis of the internal threaded hole 17*f* is perpendicular to the base plate 17*a*.

Various changes may be made in the method of fixing the integral nut 17*e* to the load cell 18, according to the kind of the load cell.

The fastening member 17*c* is vertically disposed above the integral nut 17*e*. The fastening member 17*c* is a rectangular plate-shaped member having on a center thereof a threaded hole 17*d* and taken from an actual fastening structure. The fastening member is seated at an edge thereof on the support body 17*b*, and is prevented from being rotated when the threaded part is tightened or loosened.

The fastening member 17*c* may have any shape as long as it is seated on the support body 17*b* so as not to rotate when the threaded part is tightened or loosened. The threaded hole 17*d* is vertically located above the internal threaded hole 17*f*.

Particularly, the fastening member 17*c* is spaced apart from the integral nut 17*e* by the distance A while being supported by the support body 17*b*. The distance may approximately range from 0.5 mm to 2 mm.

Since a bolt insertion depth under an actual use condition is reduced by the distance A, a smaller distance between the fastening member 17*c* and the integral nut 17*e* is preferable. However, small deformation of the fastening member 17*c* and the integral nut 17*e* that may occur when the bolt 19 is strongly tightened should be considered. For example, even if the fastening member 17*c* is deformed downwards or the integral nut 17*e* is deformed upwards when the bolt 19 is tightened, the distance should be maintained such that the fastening member 17*c* is not in contact with the integral nut 17*e*.

As such, the measuring apparatus according to the exemplary embodiment is designed in consideration of even the deformation of an object that is to be fastened by the bolt. Unless the above-mentioned distance A is ensured, it is impossible to measure exact axial force or torsional force acting on the bolt 19.

As described above, the bolt 19 is a bolt that is actually used on the site. The external threaded part 19*b* engages with the internal threaded hole 17*f*, and the bottom of the head 19*a* comes into close contact with the fastening member 17*c*. Here, the site means a fastening structure to which the bolt 19 and the integral nut 17*e* or a separable nut 27 that will be described later is applied.

Meanwhile, the manual torque application unit 13 is manipulated by a worker, and includes a socket 15*a* that accommodates the head 19*a* of the bolt 19, a torque sensing unit 15*b* that is fixed on a top of the socket 15*a*, and a lever 15*c* that applies torque to the torque sensing unit 15*b*. A handle 15*e* is located at a rear end of the lever 15*c*.

The torque sensing unit 15*b* serves to detect torque acting on the bolt 19 when the torque is applied by rotating the lever 15*c* in a state where the head 19*a* is fitted into the socket 15*a*. Information detected by the torque sensing unit 15*b* is transmitted to an external processor (not shown), and a worker may check the magnitude of torque acting on the bolt through the processor.

The configuration of the torque application unit may be variously changed as long as the torque application unit performs the above-mentioned function. For example, the torque application unit may adopt the configuration of FIG. 2 or an electric-powered torque application unit 32 shown in FIG. 3.

Figure 2:
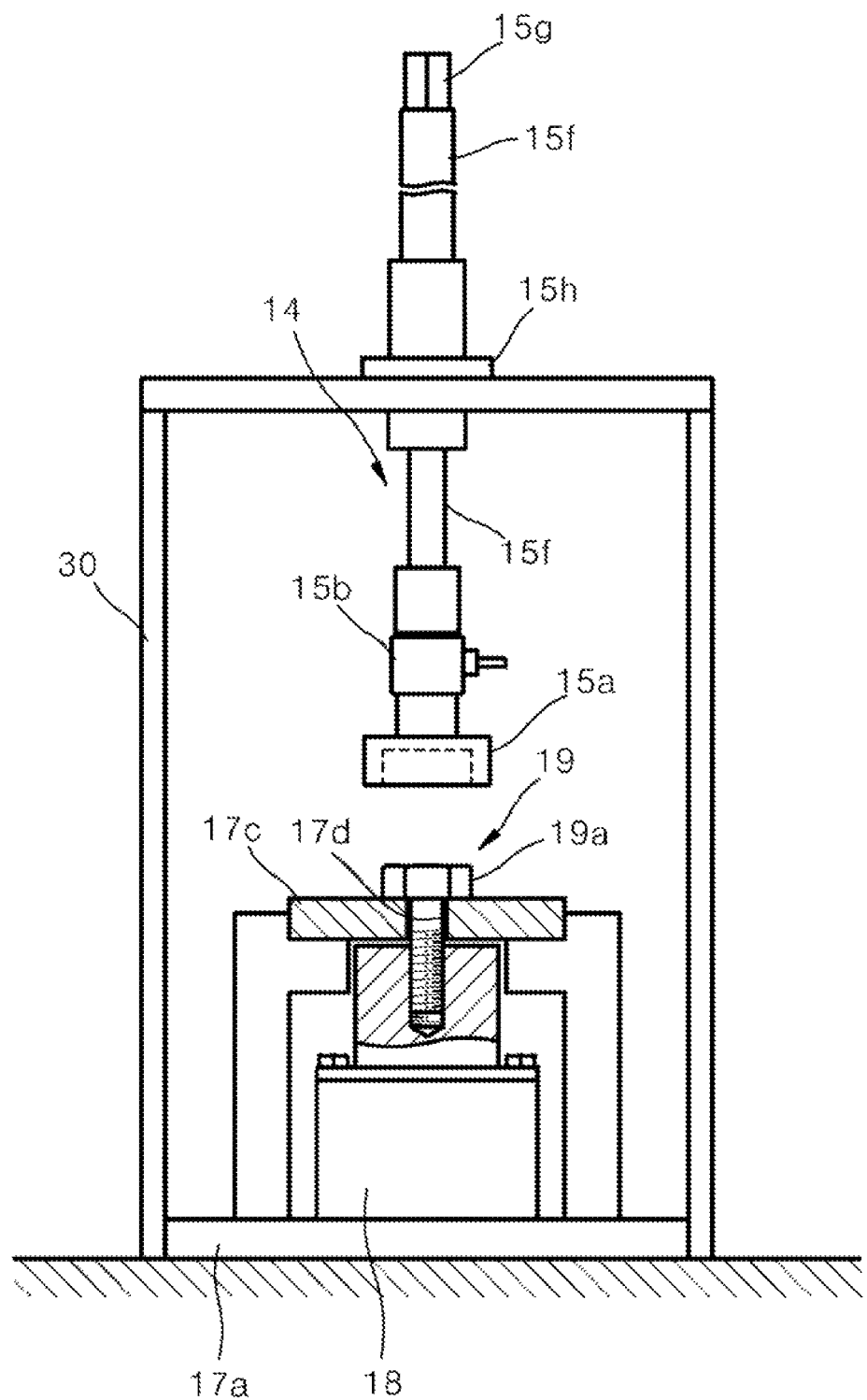

FIG. 2 is a view illustrating an example of a torque transmission unit 14 that may be additionally provided to prevent eccentricity and easily apply torque, when the bolt 19 is tightened or loosened using the manual torque application unit 13.

Hereinafter, the same reference numerals will denote the same members having the same function.

As illustrated in the drawing, the torque transmission unit 14 may include a socket 15*a* that is coupled with a bolt or a nut, a torque sensing unit 15*b* that is coupled to the socket 15*a*, a vertical shaft 15*f* that is secured to the torque sensing unit and extends vertically, a bearing 15*h* that supports a vertical shaft 15*f* to be axially rotatable, and a support frame 30 that supports the bearing.

The vertical shaft 15f is movable up and down in a vertical direction, and is supported by the bearing 15h to be rotatable only on the same axis as the bolt, thus allowing torque to be easily transmitted to the bolt without eccentricity. Reference numeral 15g denotes a wrench connector. The wrench connector is a component into which a wrench (not shown) for transmitting torque to the vertical shaft 15f is fitted.

The support frame 30 is firmly supported on the base plate 17a, and the vertical shaft 15f is rotated only on the same axis as the bolt 19 by the bearing 15h coupled to the support frame, thus allowing the bolt 19 to be tightened or loosened without eccentricity.

Figure 3:
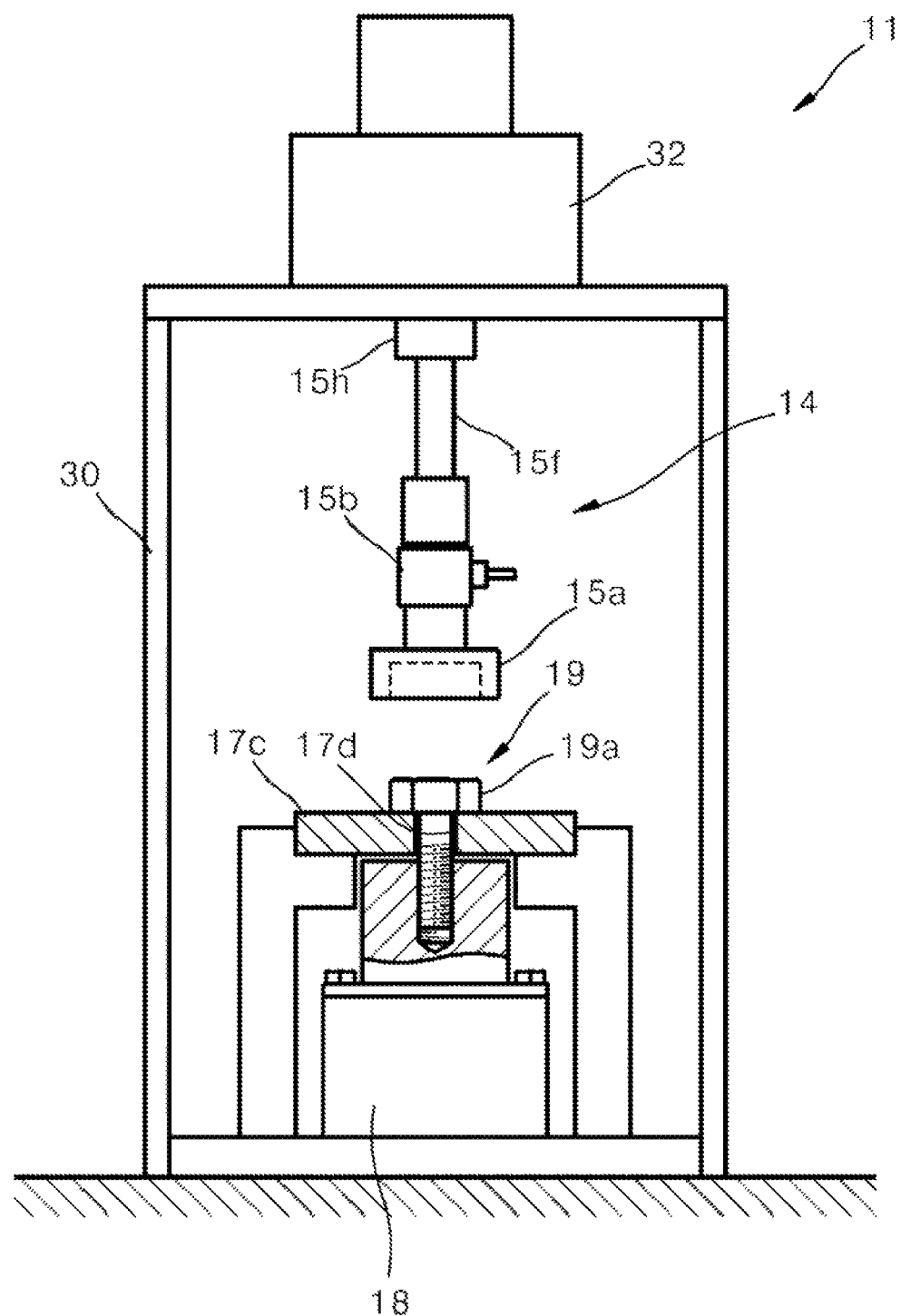

FIG. 3 is a view illustrating the apparatus for measuring the axial force and the frictional torque of FIG. 2, which is equipped with the electric-powered torque application unit 32 instead of the manual torque application unit 13.

As illustrated in the drawing, the electric-powered torque application unit 32 operated by electric power may be used, without using the manual torque application unit 13. The electric-powered torque application unit 32 is operated by external electric power to tighten or loosen the bolt 19 with preset torque.

FIG. 4 is a view illustrating another configuration example of the measuring unit 17 in the apparatus for measuring the axial force and the frictional torque shown in FIG. 1.

As illustrated in the drawing, the load cell 18 may be formed by combining separate torque load cell 18a and axial-load load cell 18b. As such, even if the torque load cell 18a and the axial-load load cell 18b are fixedly arranged vertically, it is possible to detect the axial force and the torsional force acting on the integral nut 17e without any error. Furthermore, the relative position between the axial-load load cell 18b and the torque load cell 18a may be changed as desired.

As described above, it is possible to form the measuring apparatus using only either of the torque load cell 18a or the axial-load load cell 18b, instead of the load cell 18 depending on the purpose of the test.

Figure 5:
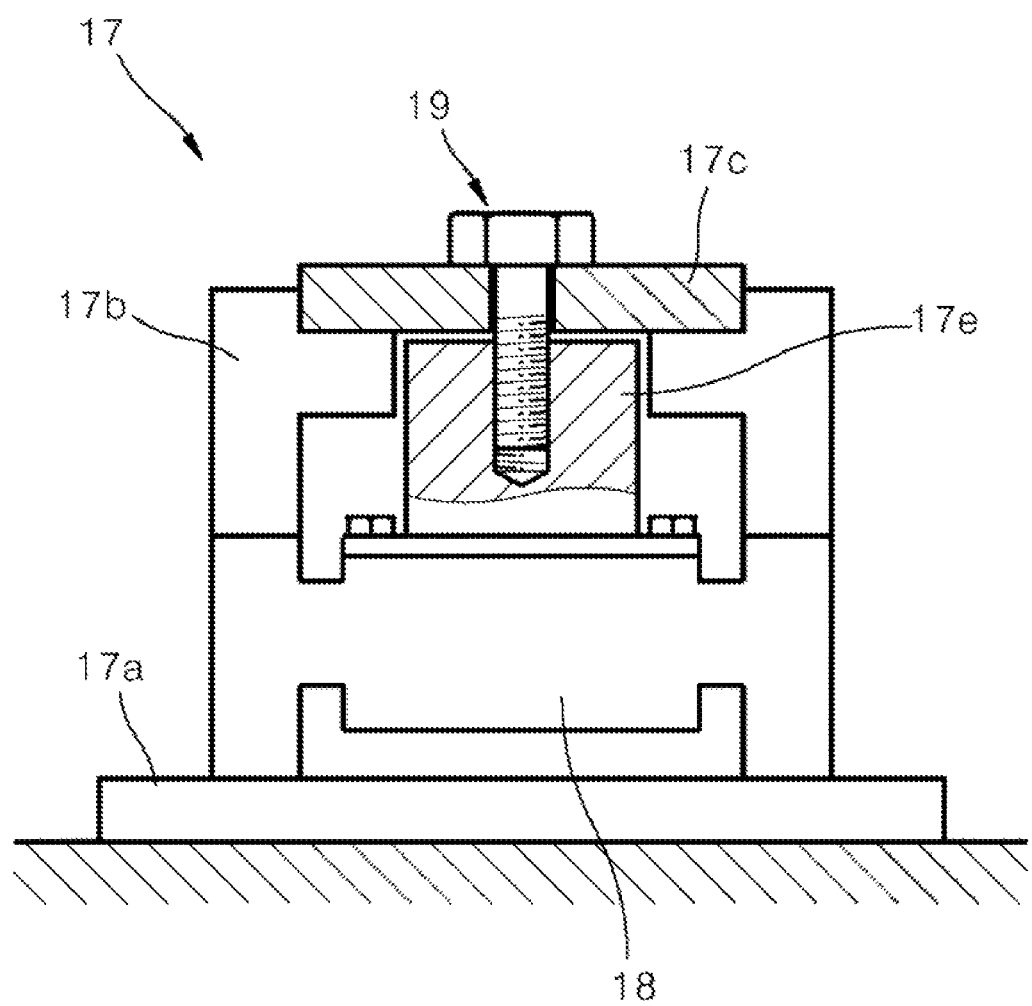

FIG. 5 is a view illustrating a further configuration example of the measuring unit 17 in the apparatus 11 for measuring the axial force and the frictional torque shown in FIG. 1.

Referring to FIG. 5, it can be seen that the support body 17b is placed on an outer perimeter of the load cell 18. As such, even if the support body 17b is placed on the load cell 18 depending on the kind of the load cell, it is possible to detect the axial force or the frictional torque.

Figure 6:
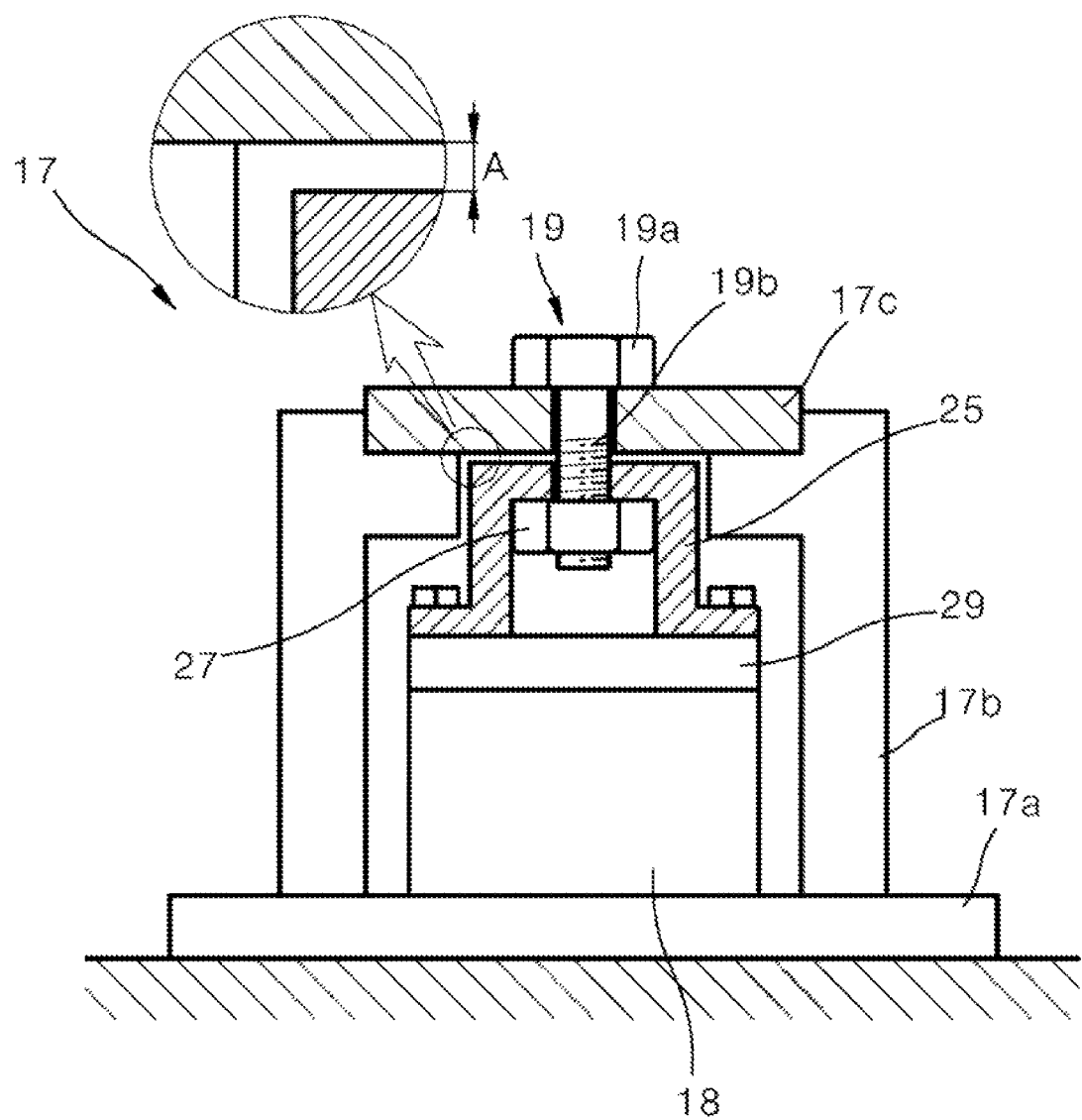

FIG. 6 is a view illustrating a further configuration example of the measuring unit 17 in the apparatus 11 for measuring the axial force and the frictional torque shown in FIG. 1.

As illustrated in the drawing, an adaptor 29 is fixed to a top of the load cell 18, and a holder 25 is supported on the adaptor 29. The adaptor 29 serves to directly fix the holder 25 to the load cell 18.

In addition, the separable nut 27 is fixedly inserted into the holder 25. The separable nut 27 is a hexagon nut that is actually used on the site, and engages with the external threaded part 19b inside the holder 25 in a screw-type fastening method. The separable nut 27 accommodated in the holder 25 is subjected to torsional force and axial force when the bolt 19 is tightened or loosened.

Figure 7:
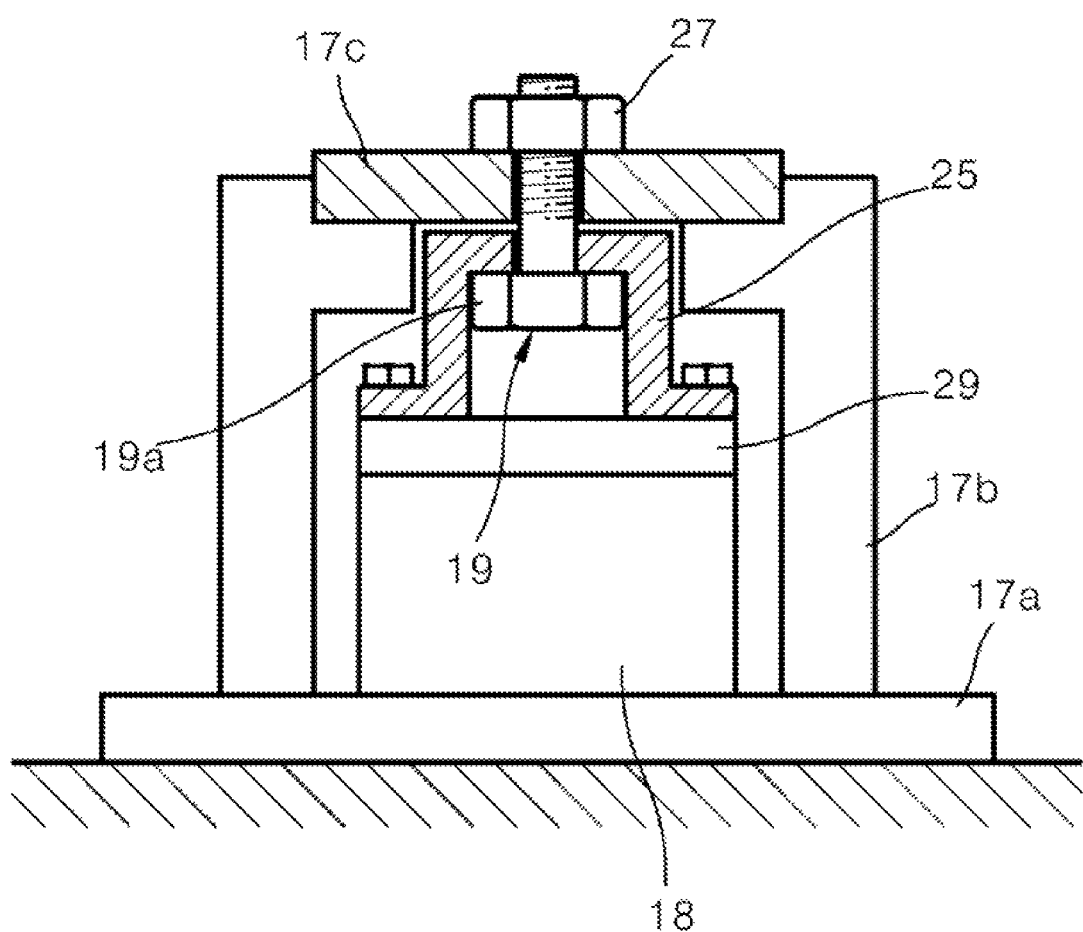

FIG. 7 is a view illustrating a further configuration example of the measuring unit 17 in the apparatus for measuring the axial force and the frictional torque shown in FIG. 1.

As illustrated in the drawing, the bolt head 19a is held by the holder 25, and is fastened to the separable nut 27 by applying torque thereto. Such a configuration may measure frictional torque and axial force when the fixing bolt is fastened by the nut on the actual site.

The torsional force and the axial force applied to the separable nut 27 of FIGS. 6 and 7 are transmitted through the holder 25 and the adaptor 29 to the load cell 18. In addition, the distance A is naturally defined between the holder 25 and the fastening member 17c.

This embodiment is used to measure the axial force and the frictional torque when the bolt or the nut is tightened so as to couple two plates with each other, for example.

Figure 8:
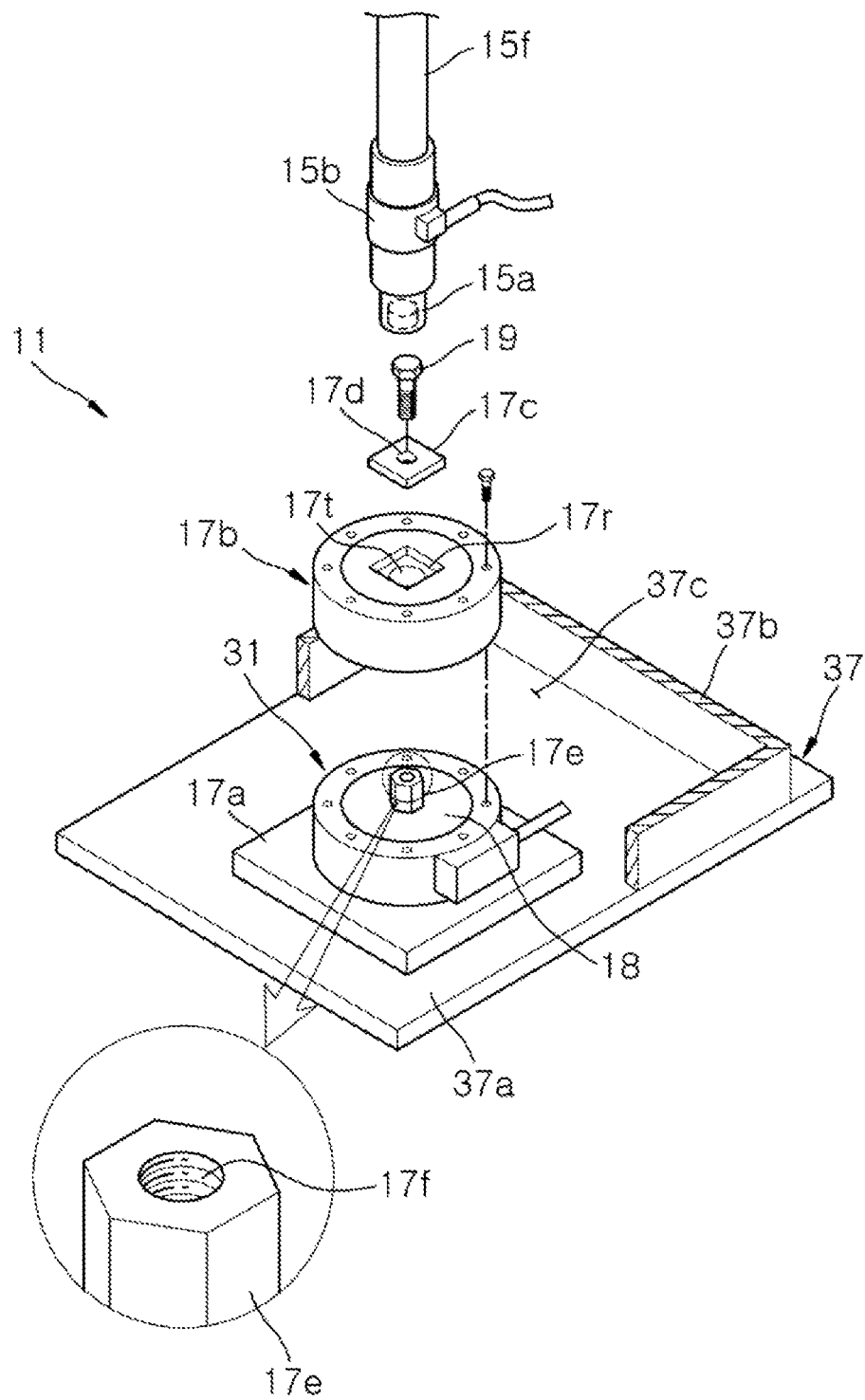
FIG. 8 is a partially cutaway exploded perspective view illustrating the apparatus for measuring the axial force and the frictional torque according to the exemplary embodiment of the present invention.
Figure 9:
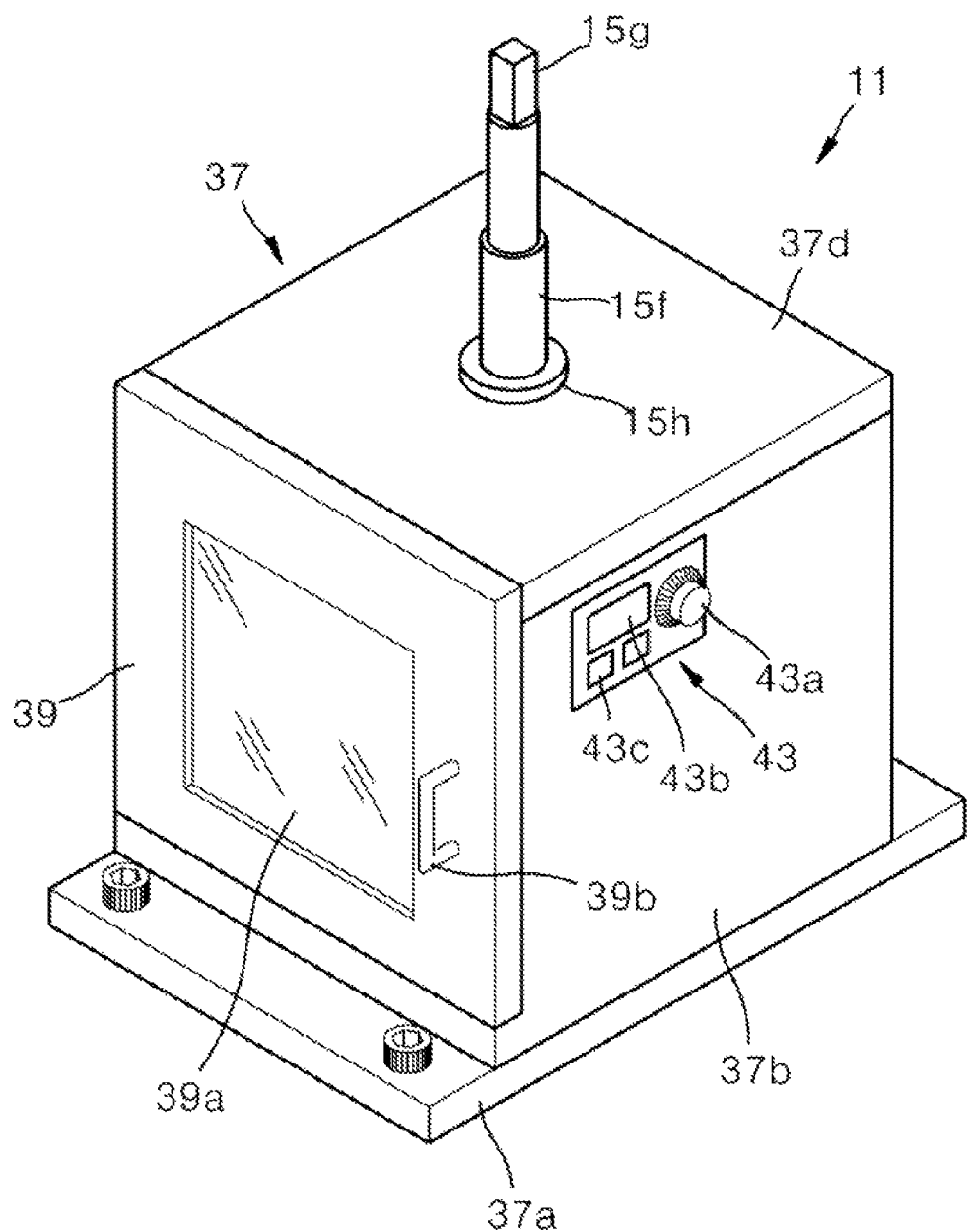
FIG. 9 is a perspective view illustrating an external structure of the apparatus for measuring the axial force and the frictional torque according to the exemplary embodiment of the present invention.
Figure 10:
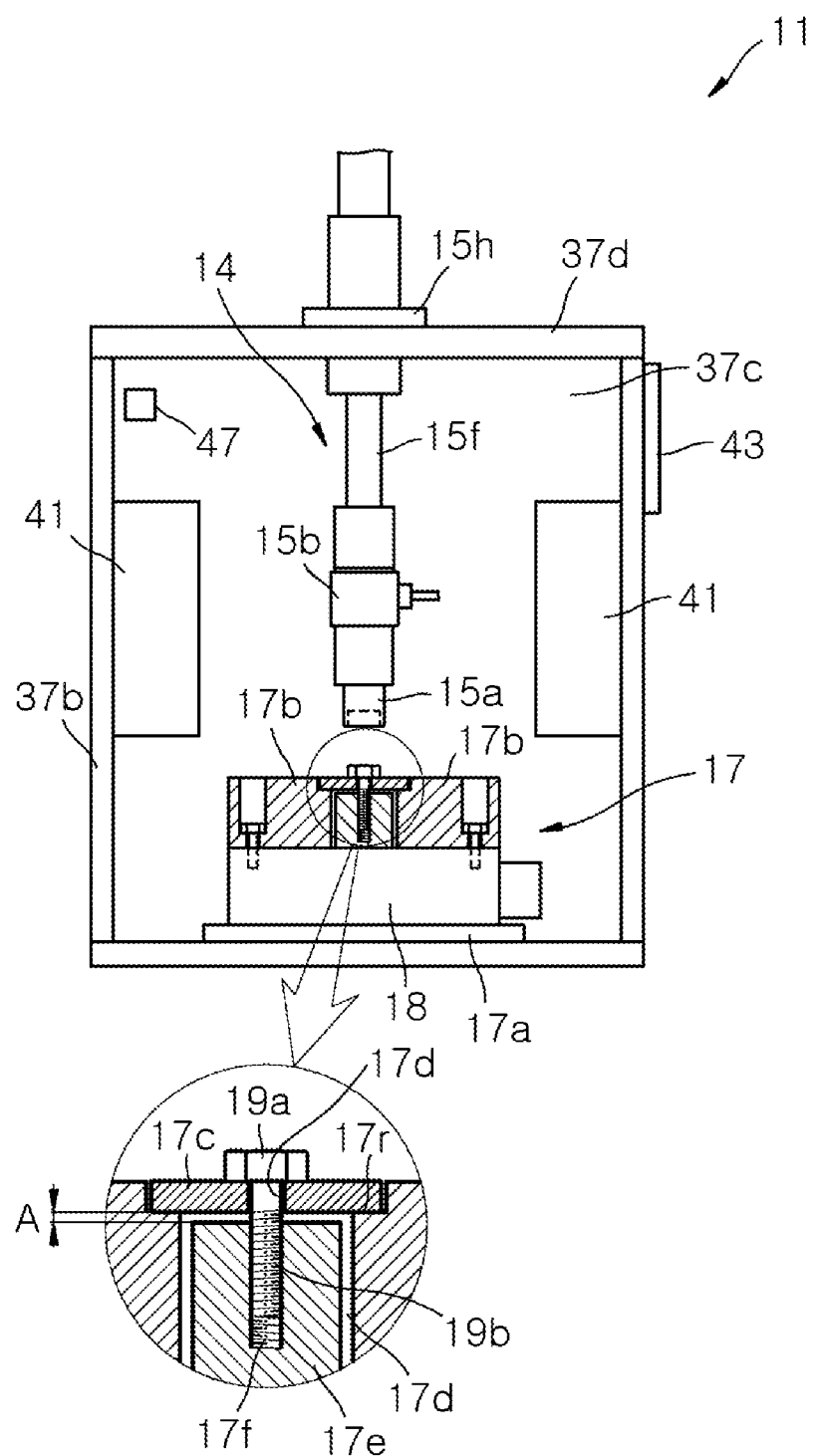
FIG. 10 is a view illustrating an internal configuration of the apparatus for measuring the axial force and the frictional torque shown in FIG. 9.

FIG. 8 is a partially cutaway exploded perspective view illustrating the apparatus 11 for measuring the axial force and the frictional torque according to the exemplary embodiment of the present invention, and FIG. 9 is a perspective view illustrating the external structure of the apparatus for measuring the axial force and the frictional torque shown in FIG. 8. Furthermore, FIG. 10 is a view illustrating the internal configuration of the apparatus for measuring the axial force and the frictional torque shown in FIG. 9.

As illustrated in the drawing, the apparatus 11 for measuring the axial force and the frictional torque according to the exemplary embodiment further includes a box-shaped casing 37. The casing 37 includes a horizontal bottom plate 37a that supports the base plate 17a, walls 37b that are vertically erected on the bottom plate 37a to form three sides, a shaft support plate 37d that covers upper ends of the walls 37b and serves as a ceiling, and a door 39 that opens or closes an internal space 37c defined by the walls 37b.

The shaft support plate 37 also serves to support the vertical shaft 15f to be axially rotatable through the bearing 15h.

Further, the door 39 is a hinged door that is joined to an associated wall 37b and has a transparent window 39a. It is possible to visually observe the internal space 37c through the transparent window 39a. Reference numeral 39b denotes a handle used to open or close the door 39.

Referring to FIG. 8, it can be seen that the base plate 17a is fixed to the center of the top of the bottom plate 37a. The base plate 17a supports the measuring unit 17 while being fixed on the bottom plate 37a.

A cylindrical support ring 31 having a predetermined inner diameter and height is fixed on the base plate 17a. The support ring 31 is a fastening member for bearing the support body 17b, and accommodates the load cell 18 therein.

Particularly, an upper surface of the load cell 18 is located under a top of the support ring 31. For example, the upper surface of the load cell 18 is located under an imaginary plane including the top of the support ring 31. According to circumstances, the support body 17b itself may be directly supported on the base plate 17a without applying the support ring 31.

The integral nut 17e is fixed to the center of the upper surface of the load cell 18. As described above, various changes may be made in the method of fixing the integral nut 17e to the load cell 18.

Further, the support body 17b is a disc-shaped member having a predetermined outer diameter and thickness and has on a central portion thereof a center hole 17t. The center hole 17t is a space accommodating the integral nut 17e. Since the integral nut 17e inserted into the center hole 17t is not in contact with an inner circumference of the center hole 17t, the torsional force or the axial force transmitted to the integral nut 17e may not be dispersed on the support body 17b.

In addition, a rectangular plate support recess 17r is formed in the center of the upper surface of the support body 17b. The plate support recess 17r is a recess accommodating the fastening member 17c, and a bottom surface of the recess is higher than the top of the integral nut 17e by the distance A, as illustrated in FIG. 10. Therefore, the lower surface of the fastening member 17c fitted into the plate support recess 17r is spaced apart from the integral nut 17e.

The fastening member 17c is a rectangular plate inserted into the plate support recess 17r. The bolt 19 passes downwards through the threaded hole 17d, so that the bolt 19 is coupled to the internal threaded hole 17f of the integral nut 17e.

Meanwhile, referring to FIG. 10, it can be seen that a temperature sensor 47 and a thermostat 41 are installed inside the wall 37b. The thermostat 41 functions to adjust the temperature of the internal space 37c, and renders a person to check a frictional coefficient considering the thermal expansion or contraction of the threaded part depending on the temperature. A thermoelement may be employed as the thermostat 41.

Such a thermostat 41 is controlled by a controller 43 that is provided outside the casing. It is possible to adjust the temperature of the internal space 37c via the controller 43. The controller 43 is a temperature adjustment unit disposed on an outer wall of the casing 37, and has a temperature adjusting switch 43a, a display window 43b, and a switch 43c.

The temperature adjusting switch 43a is a dial type switch that adjusts the exothermic temperature of the thermostat 41. It is possible to adjust the temperature of the internal space 37c of the casing 37 to an actual temperature at a point using the bolt and the nut, by using the temperature adjusting switch 43a. Since temperature effects are considered in measuring the frictional torque by operating the thermostat 41 as such, it is possible to obtain a more practical and precise measured value.

The display window 43b is an LCD window that displays the current temperature of the internal space 37c and a preset temperature. Furthermore, the switch 43c is an on-off switch that determines the operation of the thermostat 41.

A measuring method using the apparatus of measuring the axial force and the frictional torque according to the exemplary embodiment configured as such includes an internal-threaded-part setting step, a fastening-member installing step, an external-threaded-part temporary mounting step, a torque application step and a measurement step.

The internal-threaded-part setting step is a process of directly or indirectly fixing the integral nut 17e or the separable nut 27 to the top of the load cell 18.

As for the integral nut 17e, the nut 17e is directly fixed to the load cell 18 as illustrated in FIG. 1. As for the separable nut 27, the nut is indirectly fixed to the load cell via the holder 25 and the adaptor 29 as illustrated in FIG. 6.

The fastening-member installing step subsequent to the internal-threaded-part setting step is a process of positioning the fastening member 17c on the integral nut 17e or the separable nut 27. Of course, the threaded hole 17d of the fastening member 17c should correspond to the internal threaded hole of the nut, and the distance A should be defined between the bottom of the fastening member and the nut.

If the fastening member 17c is located in place through the above process, the bolt 19 passes through the threaded hole 17d to engage with the nut 17e or 27, and the temporary mounting step is performed until the lower surface of the head 19a comes into contact with the upper surface of the fastening member 17c. At this time, no torque is applied to the bolt 19 by the manual torque application unit 13.

If the temporary mounting step has been completed, the torque application step is performed. The torque application step is a process of rotating the lever 15c or the wrench 45 in a state where the socket 15a of the manual torque application unit 13 is aligned with the bolt 19, thus transmitting torque to the bolt 19.

The subsequent measurement step is a process of identifying force transmitted to the bolt 19 using the torque sensing unit 15b and the load cell 18 for measuring the axial force and the torque. That is, force detected by the torque sensing unit 15b and the load cell 18 for measuring the axial force and the torque is identified.

Data measured through the measurement step is processed through a simple mathematical operation, and makes it possible to identify frictional torque between the head 19a of the bolt 19 and the fastening member 17c.

As mentioned in the introduction, input tightening torque $T_T$ measured by the torque sensing unit 15b is the sum of torque $T_B$ generated by frictional force between the external threaded part 19b and the nut, and torque $T_W$ generated by frictional force between the head 19a and the fastening member 17c. Since the frictional torque in the external threaded part 19b is measured by the load cell 18 for measuring the axial force and the torque, it is possible to easily determine the frictional torque $T_W$ at the head through the following equation: $T_W = T_T - T_B$.

Since the axial force Q acting on the bolt 19 has been already measured, it is possible to find the frictional coefficient of the lower surface of the head 19a through both the axial force Q and the frictional torque $T_W$. Through the above-mentioned process, it is possible to determine an optimal torque value that is to be applied to the head, by identifying the inherent frictional coefficient of the head.

INDUSTRIAL APPLICABILITY

Although preferred embodiments of the invention have been disclosed for illustrative purposes, those skilled in the art will appreciate that various modifications, additions and substitutions are possible, without departing from the scope and spirit of the invention as defined in the accompanying claims.

The invention claimed is:

1. An apparatus for measuring axial force and frictional torque of a threaded part, comprising:
   a fastening member (17c) having a threaded hole (17d) through which an external threaded part passes, and coming into contact with a head (19a) of the external threaded part fitted into the threaded hole (17d);
   a support body (17b) supporting the fastening member (17c);
   an internal threaded part engaging with an external threaded part fitted into the fastening member (17c) and spaced apart from the fastening member (17c);
   measurement means fixedly supporting the internal threaded part and measuring axial load and frictional torque that are transmitted from the external threaded part to the internal threaded part; and
   a torque application unit applying torque to the external threaded part, wherein the torque application unit further comprises a torque sensing unit (15b) to measure an applied tightening torque value, torque generated by frictional force between the head (19a) and the fastening member (17c) is obtained by a value calculated by subtracting a frictional torque value measured by the measurement means from the tightening torque value measured by the torque sensing unit (15b).

2. The apparatus of claim 1, further comprising:
a base plate (17a) provided under the support body (17b),
wherein the measurement means comprises a load cell (18) to support the internal threaded part while being secured on the base plate (17a).

3. The apparatus of claim 1, further comprising:
a base plate (17a) provided under the support body (17b),
wherein the measurement means comprises at least one of a torque load cell (18a) measuring torque and an axial-load load cell (18b) measuring axial force, the load cells being disposed on the base plate (17a).

4. The apparatus of claim 1, wherein the internal threaded part comprises an integral nut (17e) that fixedly comes into close contact with the measurement means and transmits torsional force and axial force through the external threaded part (19) to the measurement means.

5. The apparatus of claim 1, wherein the internal threaded part comprises a separable nut (27) supported on a holder (25) in a state where it is separated from the measurement means, and transmitting torsional force and axial force delivered through the external threaded part (19), through the holder (25) to the measurement means.

6. The apparatus of claim 1, further comprising:
a casing (37) accommodating the measuring apparatus therein.

7. The apparatus of claim 6, wherein the casing (37) further comprises an adjustment unit to adjust temperature or humidity in the casing (37).

8. The apparatus of claim 1, further comprising:
a vertical shaft (15f) inducing torque transmitted from the torque application unit to the external threaded part or the internal threaded part, extending vertically, and positioned vertically above the external threaded part or the internal threaded part;
a bearing (15h) supporting the vertical shaft (15f) to be axially rotatable; and
a support frame (30) fixing the bearing (15h).

9. The apparatus of claim 8, wherein the torque application unit comprises a manual torque application unit (13) that is manually operated to apply torque, or an electric-powered torque application unit (32) that is operated by electric power transmitted from an outside.

10. An apparatus for measuring axial force and frictional torque of a threaded part, comprising:
a plate-shaped fastening member (17c) having a threaded hole (17d) through which an external threaded part passes;
a support body (17b) supporting the fastening member (17c);
a holder (25) holding the external threaded part in a state where the holder is located under the fastening member (17c), holding the external threaded part to allow it to pass upwards through the threaded hole (17d), and spaced apart from the fastening member (17c);
an internal threaded part coming into contact with the fastening member (17c) in a state where the internal threaded part engages with the external threaded part above the fastening member (17c);

measurement means coupled with the holder (25), and measuring axial load transmitted through the holder (25) and frictional torque between threads of the external threaded part and the internal threaded part; and
a torque application unit applying torque to the internal threaded part,
wherein the torque application unit further comprises a torque sensing unit (15b) to measure an applied tightening torque value,
torque generated by frictional force between the internal threaded part and the fastening member (17c) is obtained by a value calculated by subtracting a frictional torque value measured by the measurement means from the tightening torque value measured by the torque sensing unit (15b).

11. The apparatus of claim 10, further comprising:
a base plate (17a) provided under the support body (17b),
wherein the measurement means comprises a load cell (18) to support the holder (25) while being secured on the base plate (17a).

12. The apparatus of claim 10, further comprising:
a base plate (17a) provided under the support body (17b),
wherein the measurement means comprises at least one of a torque load cell (18a) measuring torque and an axial-load load cell (18b) measuring axial force, the load cells being disposed on the base plate (17a).

13. The apparatus of claim 10, further comprising:
a casing (37) accommodating the measuring apparatus therein.

14. The apparatus of claim 13, wherein the casing (37) further comprises an adjustment unit to adjust temperature or humidity in the casing (37).

15. The apparatus of claim 10, further comprising:
a vertical shaft (15f) inducing torque transmitted from the torque application unit to the external threaded part or the internal threaded part, extending vertically, and positioned vertically above the external threaded part or the internal threaded part;
a bearing (15h) supporting the vertical shaft (15f) to be axially rotatable; and
a support frame (30) fixing the bearing (15h).

16. The apparatus of claim 15, wherein the torque application unit comprises a manual torque application unit (13) that is manually operated to apply torque, or an electric-powered torque application unit (32) that is operated by electric power transmitted from an outside.

17. A method of measuring axial force and frictional torque of a threaded part, comprising:
an internal-thread setting step of directly or indirectly setting an internal threaded part to measurement means that measures the axial force and the torsional force;
a fastening-member installing step of installing a fastening member (17c) with a threaded hole (17d) through which an external threaded part passes, such that the fastening member corresponds to the internal threaded part while being spaced apart therefrom;
a temporary mounting step of coupling the external threaded part to the internal threaded part such that the external threaded part passes through the threaded hole (17d) and thereby a head (19a) of the external threaded part comes into contact with the fastening member (17c);
a torque application step of applying torque to the external threaded part when the temporary mounting step has been completed, thus transmitting axial force and torsional force to the internal threaded part; and a measurement step of measuring force transmitted to the internal threaded part, using the measurement means, wherein, at the torque application step, a torque application unit applying the torque to the external threaded part measures an applied tightening torque value, using a torque sensing unit (15*b*), at the measurement step, the measurement means is coupled with a holder (25) and measures axial load transmitted through the holder (25) and frictional torque between threads of the external threaded part and the internal threaded part, torque generated by frictional force between the head (19*a*) and the fastening member (17*c*) is obtained by a value calculated by subtracting a frictional torque value measured by the measurement means from the tightening torque value measured by the torque sensing unit (15*b*).

18. A method of measuring axial force and frictional torque of a threaded part, comprising:

a holder setting step of setting a holder (25) to measurement means that measures the axial force and the torsional force;

a fastening-member installing step of installing a plate-shaped fastening member (17*c*) with a threaded hole (17*d*) such that the fastening member is correspondingly located above the holder (25) to be spaced apart therefrom;

a temporary mounting step of causing an external threaded part to pass upwards through the holder (25) such that the external threaded part passes upwards through the threaded hole (17*d*) of the fastening member (17*c*), coupling an internal threaded part with the external threaded part above the fastening member (17*c*), and rendering the internal threaded part after coupling to come into contact with the fastening member (17*c*);

a torque application step of applying torque to the internal threaded part when the temporary mounting step has been completed, thus transmitting axial force and torsional force to the holder (25); and a measurement step of measuring force transmitted to the holder (25), using the measurement means, wherein, at the torque application step, a torque application unit applying the torque to the internal threaded part measures an applied tightening torque value, using a torque sensing unit (15*b*), at the measurement step, the measurement means is coupled with the holder (25) and measures axial load transmitted through the holder (25) and frictional torque between threads of the external threaded part and the internal threaded part, torque generated by frictional force between the internal threaded part and the fastening member (17*c*) is obtained by a value calculated by subtracting a frictional torque value measured by the measurement means from the tightening torque value measured by the torque sensing unit (15*b*).

\* \* \* \* \*